(12) United States Patent
Thomas et al.

(10) Patent No.: US 12,185,129 B2
(45) Date of Patent: Dec. 31, 2024

(54) UTILIZING INVARIANT USER BEHAVIOR DATA FOR TRAINING A MACHINE LEARNING MODEL

(71) Applicant: VIAVI Solutions Inc., San Jose, CA (US)

(72) Inventors: Howard John Thomas, Stonehouse (GB); Christopher Michael Murphy, Bath (GB); Kexuan Sun, Stevenage (GB); Agustin Pozuelo, County Dublin (IE); Baruch Friedman, Dublin (IE); Takai Eddine Kennouche, Meylan (FR)

(73) Assignee: VIAVI Solutions Inc., Chandler, AZ (US)

( * ) Notice: Subject to any disclaimer, the term of this patent is extended or adjusted under 35 U.S.C. 154(b) by 392 days.

(21) Appl. No.: 17/656,634

(22) Filed: Mar. 25, 2022

(65) Prior Publication Data
US 2023/0308899 A1     Sep. 28, 2023

(51) Int. Cl.
| | |
|---|---|
| *H04W 24/02* | (2009.01) |
| *G06N 5/022* | (2023.01) |
| *H04W 16/22* | (2009.01) |
| *H04W 24/08* | (2009.01) |

(52) U.S. Cl.
CPC ............ *H04W 24/02* (2013.01); *G06N 5/022* (2013.01); *H04W 16/22* (2013.01); *H04W 24/08* (2013.01)

(58) Field of Classification Search
CPC ..... H04W 16/22; H04W 24/02; H04W 24/08; G06N 5/022
See application file for complete search history.

(56) References Cited

U.S. PATENT DOCUMENTS

2019/0319868 A1* 10/2019 Svennebring ......... H04W 24/08

FOREIGN PATENT DOCUMENTS

EP     2299753 A1     3/2011

OTHER PUBLICATIONS

Kleinmeier et al., "Vadere: An open-source simulation framework to promote interdisciplinary understanding," Technical University of Munich, Department of Informatics, Jul. 16, 2019, 18 Pages.
(Continued)

*Primary Examiner* — Elton Williams
(74) *Attorney, Agent, or Firm* — Harrity & Harrity, LLP

(57) ABSTRACT

A device may receive mobile radio data identifying utilization of a mobile radio network that includes base stations and user devices in a geographical area. The device may process the mobile radio data, with a machine learning feature extraction model, to generate a behavioral representation, that is probabilistic in nature, of invariant aspects of spatiotemporal utilization of the mobile radio network. The device may generate one or more instances of the spatiotemporal utilization of the mobile radio network that reflects the probabilistic nature of a spatiotemporal predictable component of the behavioral representation. The device may utilize the one or more instances of the spatiotemporal utilization of the mobile radio network as a dataset for training or evaluating a system to manage performance of the mobile radio network.

20 Claims, 9 Drawing Sheets

(56) References Cited

OTHER PUBLICATIONS

Assem H., "Extracting New Urban Patterns in Cities: Analysis, Models and Applications," Mar. 2018, pp. 1-172, XP055638792, Retrieved from the Internet: [URL: http://www.tara.tod.je/handle/2262/82729].
Extended European Search Report for Application No. EP23164178.8, mailed on Jul. 11, 2023, 8 pages.

* cited by examiner

UTILIZING INVARIANT USER BEHAVIOR DATA FOR TRAINING A MACHINE LEARNING MODEL

BACKGROUND

Historically, simulated radio test data has been used to estimate radio system performance (e.g., performance of a cellular network, such as a fifth-generation (5G) network). The radio test data may be simulated via current simulation techniques, such as user behavior simulation techniques or simplified simulation techniques.

SUMMARY

Some implementations described herein relate to a method. The method may include receiving mobile radio data identifying utilization of a mobile radio network that includes base stations and user devices in a geographical area, and processing, the mobile radio data, with a machine learning feature extraction model, to generate a behavioral representation, that is probabilistic in nature, of invariant aspects of spatiotemporal utilization of the mobile radio network. The method may include generating one or more instances of the spatiotemporal utilization of the mobile radio network that reflects the probabilistic nature of a spatiotemporal predictable component of the behavioral representation. The method may include utilizing the one or more instances of the spatiotemporal utilization of the mobile radio network as a dataset for training or evaluating a system to manage performance of the mobile radio network.

Some implementations described herein relate to a device. The device may include one or more memories and one or more processors coupled to the one or more memories. The one or more processors may be configured to receive mobile radio data identifying utilization of a mobile radio network that includes base stations and user devices in a geographical area, and process the mobile radio data, with a machine learning feature extraction model, to generate a behavioral representation, that is probabilistic in nature, of invariant aspects of spatiotemporal utilization of the mobile radio network. The one or more processors may be configured to generate one or more instances of the spatiotemporal utilization of the mobile radio network that reflects the probabilistic nature of a spatiotemporal predictable component of the behavioral representation. The one or more processors may be configured to utilize the one or more instances of the spatiotemporal utilization of the mobile radio network as a dataset for training or evaluating a system to manage performance of the mobile radio network.

Some implementations described herein relate to a non-transitory computer-readable medium that stores a set of instructions for a device. The set of instructions, when executed by one or more processors of the device, may cause the device to receive mobile radio data identifying utilization of a mobile radio network that includes base stations and user devices in a geographical area, and process the mobile radio data, with a machine learning feature extraction model, to generate a behavioral representation, that is probabilistic in nature, of invariant aspects of spatiotemporal utilization of the mobile radio network. The set of instructions, when executed by one or more processors of the device, may cause the device to generate one or more instances of the spatiotemporal utilization of the mobile radio network that reflects the probabilistic nature of a spatiotemporal predictable component of the behavioral representation. The set of instructions, when executed by one or more processors of the device, may cause the device to utilize the one or more instances of the spatiotemporal utilization of the mobile radio network as a dataset for training or evaluating a system to manage performance of the mobile radio network.

DETAILED DESCRIPTION

Figure 1A:
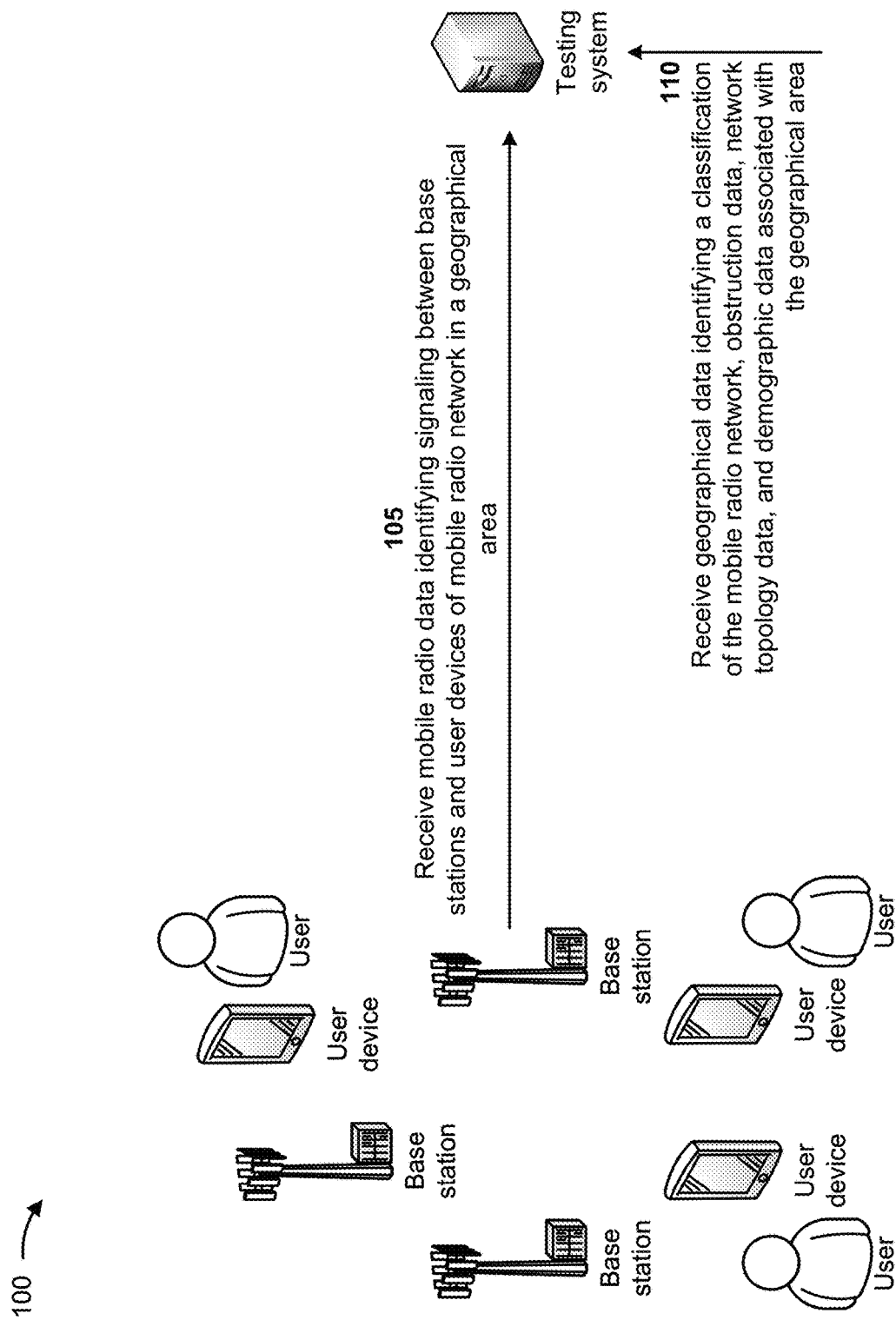
FIGS. 1A-1F are diagrams of an example implementation described herein.

The following detailed description of example implementations refers to the accompanying drawings. The same reference numbers in different drawings may identify the same or similar elements.

A subscriber's behavior may include a set of journeys with attributes, such as from where and to where a mobile subscriber is travelling, a route utilized, a speed profile, a time at which a journey occurs, mobile radio services that are consumed on a route, mobile radio network elements utilized during a journey (e.g., base stations, antenna systems, relays, repeaters, Wi-Fi, and/or the like), mobile radio resource elements consumed during a journey (e.g., transmission time, radio carrier frequency, radio frequency bandwidth, spatial streams, physical resource blocks, subcarriers, and/or the like), and/or the like. For an individual subscriber, behavior may be represented as an ensemble of all journeys with associated attributes that are taken over time together with an associated probability. Some attributes may be more repeatable or predictable (e.g., routes) and other attributes may be more stochastic (e.g., consumed services and corresponding network resources). The consumed network resources and a quality of experience achieved for a mobile device throughout a journey may be influenced by a network topology and by loading of a network by other subscribers (e.g., which influence a quality of radio channels). From a network view, or a subscriber population view, behavior of a set of subscribers in a mobile radio system may be represented as a superset of ensembles of journeys and associated attributes (e.g., which may exhibit repeatable trends as well as stochastic characteristics). For example, certain routes may be more busy than other routes, certain transitions between portions of routes may be more likely, and/or the like. Certain patterns of behavior at a network level may be more likely and may be predicted or extrapolated with varying degrees of certainty for varying time intervals.

Behavior of subscribers in the network may be determined from information identifying locations and trajectories of subscriber devices, which may be determined from location services, such as GNSS, from radio-based geolocation, and/or the like. This information may be utilized to train one or more models for characterizing invariant user behavior.

A network may be optimized to serve a particular distribution of subscribers and subscriber traffic demand. If subscriber behavior can be determined in advance, network behavior may be improved. Thus, a network management system that is able to learn aspects of behavior that are predictable may out-perform a network management system that is unable to learn aspects of behavior. Determining a performance of a network management system with learning capabilities may require a challenge vector that includes elements that are discoverable and exploitable by the network management system. Creating realistic invariant user behavior may enable a mobile radio network to be optimized and may enable performance of the mobile radio network to be evaluated, without having to operate the network management system in an operational environment with real customers.

Current simulation and prediction of network management system performance typically utilize unrealistic models of user behavior, such as randomly placing users according to a uniform distribution, using simple trajectories, and/or the like. Thus, such simulation and prediction cannot be used to reliably train a network management system to optimize the mobile radio network nor to evaluate performance of the mobile radio network, the associated network management system, and/or the like.

User behavior (e.g., including trajectory and application activity data) in a real world system may include an element of invariant behavior similarities that may arise in different ways and may exhibit similarities on different geographic and temporal scales. For example, a user of a user device may follow a similar route using similar modes of transportation and with a similar temporal profile to get from home to work, which may provide a similar application usage profile; groups of individuals may move in similar ways along certain routes (e.g., highways, streets, sidewalks, building entrances and common areas, and/or the like) with similar application usage profiles (e.g., web browsing, social media, voice communications, email, and/or the like); and/or the like. The trajectories followed by the users may influence each other depending on a density of the users and interactions with physical constraints (e.g., obstructions, such as buildings, trees, and/or the like) of the mobile radio network.

The patterns of user behavior may vary based on a time of day, a day of a week, existence of special events (e.g., sporting events, traffic accidents, road congestion, holiday seasons, and/or the like), and/or the like. Consequently, the pattern of user behavior may vary over time and geography. Some user behavior patterns may be characterized as "normal" or "steady state," while other user behavior patterns may be characterized as seasonal, anomalous, and/or the like. Performance of a mobile radio network (e.g., a 5G network) may vary in response to changing user behaviors and network configuration parameters, that may provide optimal network performance for a set of users, applications, network slices, and/or the like, may consequently change. Additionally, an optimal manner in which the network configuration parameters are adapted (e.g., a rate of change, a prioritization of a network slice, a pointing angle of a directional antenna, a transmission power, a prioritization of subcarriers, a propensity to handover, a propensity to utilize different radio carriers, a propensity to utilize different radio technologies, and/or the like) may also vary based on changing user behaviors.

A radio access network (RAN) may include one or more optimization components for managing the operation of the RAN, improving the performance of network components, mitigating the impact of transient/inherent impairments, improving the quality of the service consumed by the users of the RAN, and/or the like. Such optimization components may be collocated with any of the network components, such as a base station, a radio unit, a distributed unit, a central unit, a RAN intelligent controller (RIC), an edge compute device, and/or the like. Alternatively, such optimization components may be implemented separately from any of the components of the RAN. The optimization components determine specific characteristics of the radio environment in which they operate and exploit these characteristics to achieve goals. In order to learn about the specific characteristics of the radio environment, the optimization components may employ machine learning models, reinforcement learning models, evolutionary models, explicitly programmed models, and/or the like.

Thus, user behavior simulation techniques and the simplified simulation techniques fail to generate simulated radio test data that includes an element of user behavior that is spatially invariant (e.g., not temporal). Without such simulated radio test data, a radio access network (RAN) intelligent controller (RIC) (e.g., associated with base station), with a machine learning model, is unable to learn about and apply user behavior data to real radio test data. Furthermore, without such simulated radio test data, a testing system may be unable to correctly or properly evaluate a performance of the RIC and/or the machine learning model. Additionally, the lack of such simulated radio test data makes testing difficult for a system that uses received radio parameters to estimate user geo-location.

Therefore, current techniques for generating simulated radio test data consume computing resources (e.g., processing resources, memory resources, communication resources, and/or the like), networking resources, and/or the like associated with utilizing an insufficiently realistic user behavior simulation technique, incorrectly identifying user behavior associated with a base station that includes a RIC and a machine learning model, incorrectly making incorrect modifications to the base station based on the incorrectly identified user behavior, discovering and correcting the incorrect modifications to the base station, and/or the like.

Some implementations described herein relate to a testing system that utilizes invariant user behavior data for training a machine learning model. For example, the testing system may receive mobile radio data identifying utilization of a mobile radio network that includes base stations and user devices in a geographical area. The testing system may process the mobile radio data, with a machine learning feature extraction model, to generate a behavioral representation, that is probabilistic in nature, of invariant aspects of spatiotemporal utilization of the mobile radio network. The testing system may generate one or more instances of the spatiotemporal utilization of the mobile radio network that reflects the probabilistic nature of a spatiotemporal predictable component of the behavioral representation. The testing system may utilize the one or more instances of the spatiotemporal utilization of the mobile radio network as a dataset for training or evaluating a system to manage performance of the mobile radio network.

In this way, the testing system utilizes invariant user behavior data for training a machine learning model. The testing system may generate signature data that include invariant user behavior patterns with a degree of random variation. The signature data may include a user behavior that represents different user operation modes (e.g., peak hour, steady state, holiday, nighttime, a sporting event, and/or the like) of a mobile radio network. The user behavior may also represent changes between the different user operation modes, anomalous events where users congregate in areas different than a steady state behavior, and/or the like. The testing system may utilize the signature data to train a machine learning model utilized by a base station to identify user behavior patterns associated with the base station. This, in turn, conserves computing resources, networking resources, and/or the like that would otherwise have been consumed in utilizing an insufficiently realistic user behavior simulation technique, incorrectly identifying user behavior associated with a base station that includes a RIC and a machine learning model, incorrectly making incorrect modifications to the base station based on the incorrectly identified user behavior, discovering and correcting the incorrect modifications to the base station, and/or the like.

FIGS. 1A-1F are diagrams of an example 100 associated with utilizing invariant user behavior data for training a machine learning model. As shown in FIGS. 1A-1F, example 100 includes a mobile radio network associated with a testing system. The mobile radio network may include multiple base stations communicating with multiple user devices. Further details of the base stations, the user devices, and the testing system are provided elsewhere herein.

As shown in FIG. 1A, and by reference number 105, the testing system may receive mobile radio data identifying signaling between the base stations and the user devices of the mobile radio network in a geographical area. For example, the testing system may periodically receive the mobile radio data from the base stations and the user devices over a time period, may continuously receive the mobile radio data from the base stations and the user devices over a time period, and/or the like. Each of the base stations may communicate with one or more user devices via signaling. Since each of the base stations is a transceiver, the signaling may include wireless (e.g., radio frequency (RF)) signals transmitted by the base station to the one or more user devices, wireless (e.g., RF) signals received by the base station from the one or more user devices, wireless signals received by one or more user devices from one or more base station, wireless signals received by one or more user devices from one or more user devices, and/or the like. The signaling may enable each of the base stations to communicate with the one or more user devices and provide services (e.g., telecommunications services, connections to other networks, and/or the like) to the one or more user devices. The signaling may enable a first user device to communicate with one or more second user devices and provide services to the one or more second user devices. A received strength of a signal between a base station and a user device may depend on a proximity of the base station and the user device, signal power output of the base station, signal power output of the user device, a quantity of obstructions provided between the base station and the user device, types of obstructions provided between the base station and the user device, the degree of non-line-of-sight propagation between the base station and the user device, the degree of constructive and/or destructive interference between different propagation paths at the receiver, and/or the like.

In some implementations, the mobile radio data may include measurements or key performance indicators (KPIs) associated with the signaling provided between the base stations and the user devices of the mobile radio network in the geographical area (e.g., over a time period). The measurements may include events (e.g., connections, traffic transmission, traffic reception, and/or the like) recorded by performance counters associated with the base stations and/or the user devices. The KPIs may be calculated based on the measurements (e.g., the recorded events). The KPIs may include bandwidths, throughputs, signal strengths, availability indicators (e.g., percentages of time that the base stations are providing services to the user devices), network resource indicators (e.g., traffic and control channels provided by the base stations), handover indicators (e.g., a handover of a moving user device from one base station to another base station), voice service indicators, data service indicators, and/or the like. In some implementations, the testing system may receive the measurements and/or the signaling from the base stations and/or the user devices, and may calculate the KPIs based on the measurements and/or the signaling.

As further shown in FIG. 1A, and by reference number 110, the testing system may receive geographical data identifying a classification of the mobile radio network, obstruction data, network topology data, and demographic data associated with the geographical area. The classification of the mobile radio network may include a classification type of the mobile radio network, such as rural environment, an urban environment, a dense urban environment, a transport hub environment, an urban park environment, a suburban environment, and/or the like. The obstruction data may include data identifying locations and characteristics of obstructions provided within the geographical area. The obstructions data may include map data identifying streets, buildings, sidewalks, highways, street poles, traffic signs, statues, trees, and/or the like provided within the geographical area. The map data may identify the invariant (e.g., fixed or non-temporal) obstructions provided within the geographical area. The obstruction data may include data identifying characteristics of the obstructions, such as building footprints and heights, street widths and lengths, sidewalk widths and lengths, street pole footprints and heights, tree footprints and heights, materials utilized in the buildings, materials utilized in the streets, and/or the like. In some implementations, the obstruction data may identify variant (e.g., temporal) obstructions (e.g., vehicles, people, and/or the like) provided within the geographical area. Such information may be obtained from historical traffic data identifying historical vehicle traffic patterns during the time period (e.g., one hour, one day, and/or the like), historical quantities of vehicles during the time period, historical pedestrian traffic patterns during the time period, historical quantities of pedestrians during the time period, and/or the like. Although temporal, such obstructions may still obstruct and affect signaling between the base stations and the user devices.

The network topology data may include data identifying locations of the base stations in the mobile radio environment, a quantity of antennas provided on each of the base stations, characteristics of the antennas of the base stations, and/or the like. The demographic data may include data identifying demographic factors of the geographical location, such as a population living in the geographical location, transit the geographical location, shopping in the geographical location, work sites in the geographical location, maps of the geographical location, models and/or photographs of the geographical location, building locations in the geographical location, and/or the like.

Figure 1B:
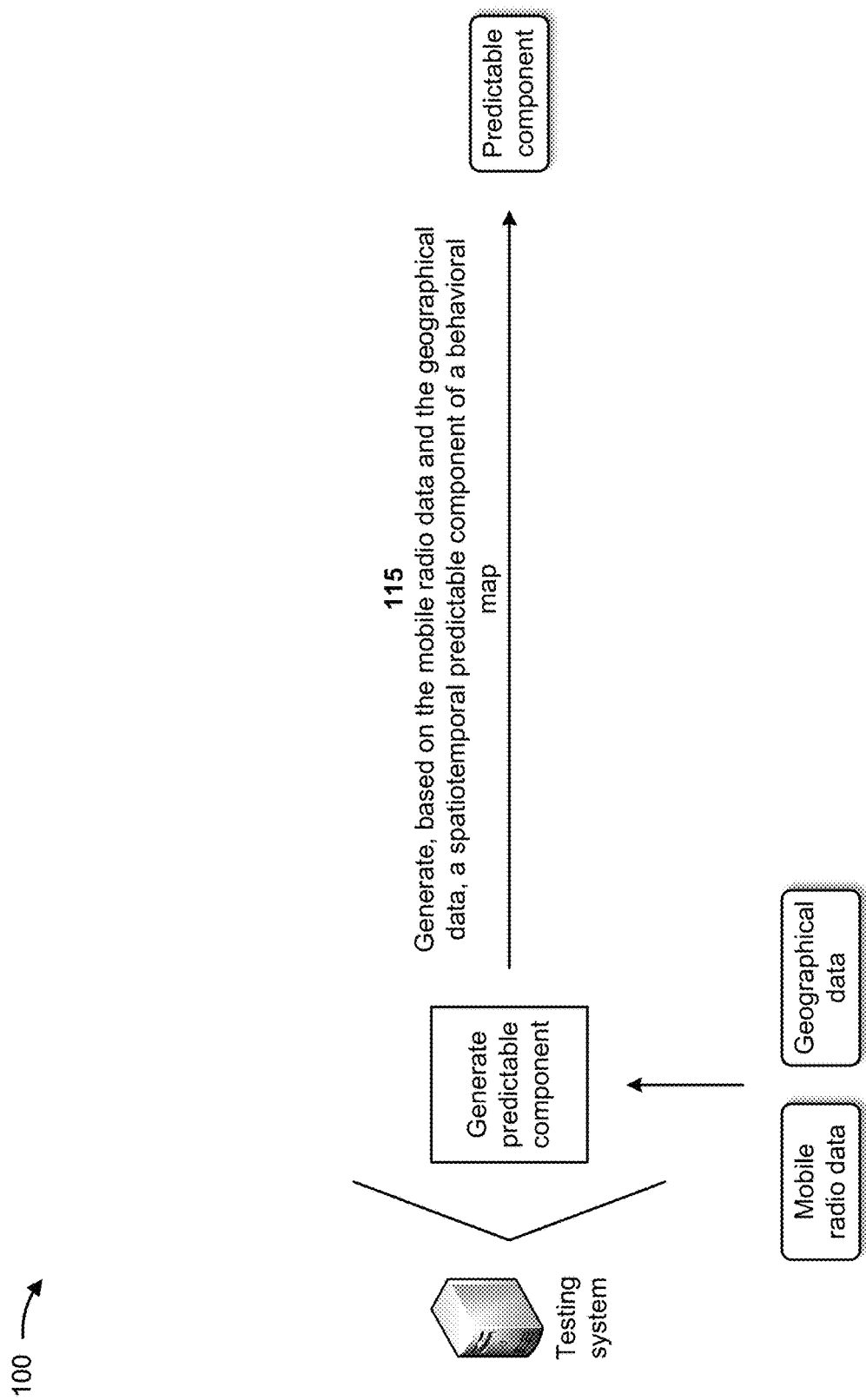

As shown in FIG. 1B, and by reference number 115, the testing system may generate, based on the mobile radio data and the geographical data, a spatiotemporal predictable component of a behavioral map (e.g., a behavioral representation). For example, each of the base stations may be associated with multiple behavioral maps since each base station may provide signaling to multiple user devices and the signaling may experience different user behaviors from multiple user devices in a coverage area of each base station. A behavioral map may represent user behaviors as scalar values with a correlation between adjacent points following exponentially decaying autocorrelation values with decorrelation distances representing characteristics of the mobile radio network (e.g., characteristics representative of behavior of the user devices in the mobile radio network). Since the user behavior may be captured at an appropriate level of spatial granularity to an assumed spatial decorrelation distance, the testing system may determine intermediate values by interpolation. In some implementations, the behavioral map may include a spatiotemporal predictable component that captures alterations to the mobile radio data caused by the user devices provided within the geographical location.

Figure 1C:
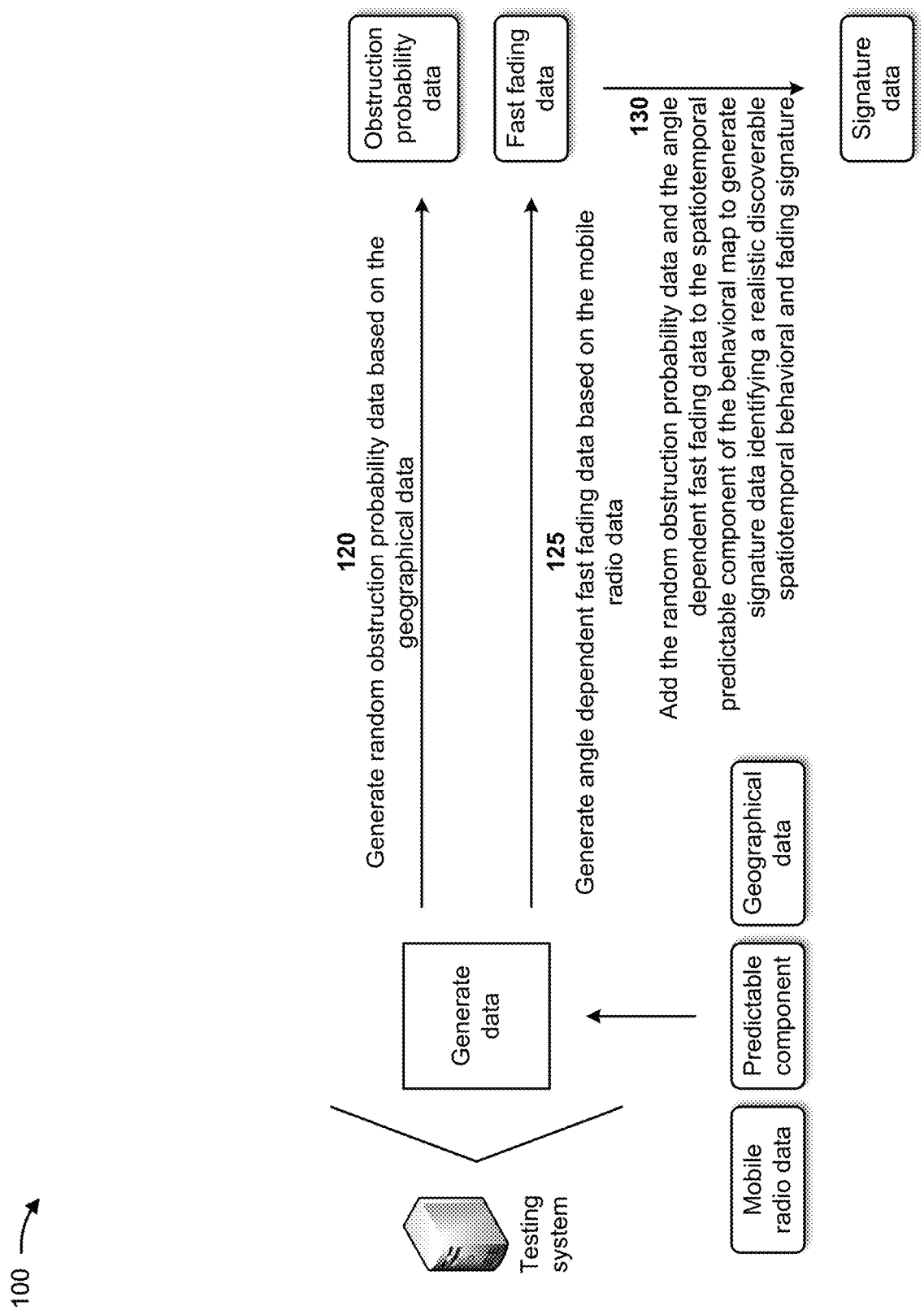

As shown in FIG. 1C, and by reference number 120, the testing system may generate random obstruction probability data based on the geographical data. For example, the testing system may select random obstruction probability data, from the geographical data, based on a similarity of the geographical data with known factors about the geographical location. The similarity may be determined based on characteristics of the geographical location, types of obstructions (e.g., train station, road intersection, and/or the like) in the geographical location, pattern matching with historical geographical locations, and/or the like. In some implementations, the testing system may generate multiple random obstruction probability data sets based on the geographical data. In some implementations, the testing system may select stochastically likely behavioral characteristics from the mobile radio data based on a similarity of demographic, user population, building density, road density, building usage, and/or the like, of the two different geographical areas.

As further shown in FIG. 1C, and by reference number 125, the testing system may generate angle dependent fast fading data based on the mobile radio data. For example, the testing system may generate the angle dependent fast fading data based on various scattered signals included in the mobile radio data. The testing system may generate the angle dependent fast fading data using one or more statistical models. In some implementations, the testing system may generate multiple angle dependent fast fading data sets based on the mobile radio data.

As further shown in FIG. 1C, and by reference number 130, the testing system may add the random obstruction probability data and the angle dependent fast fading data to the spatiotemporal predictable component of the behavioral map to generate signature data identifying a realistic discoverable spatiotemporal behavioral and fading signature. For example, the testing system may generate multiple composite waveforms (e.g., multiple signatures) with the same behavioral component (e.g., the spatiotemporal predictable component of the behavioral map) but with independent obstruction-based fading (e.g., the random obstruction probability data) and fast fading (e.g., the angle dependent fast fading data), which may enable determination of an ability of an optimization component to detect and make use of the behavioral component.

Figure 1D:
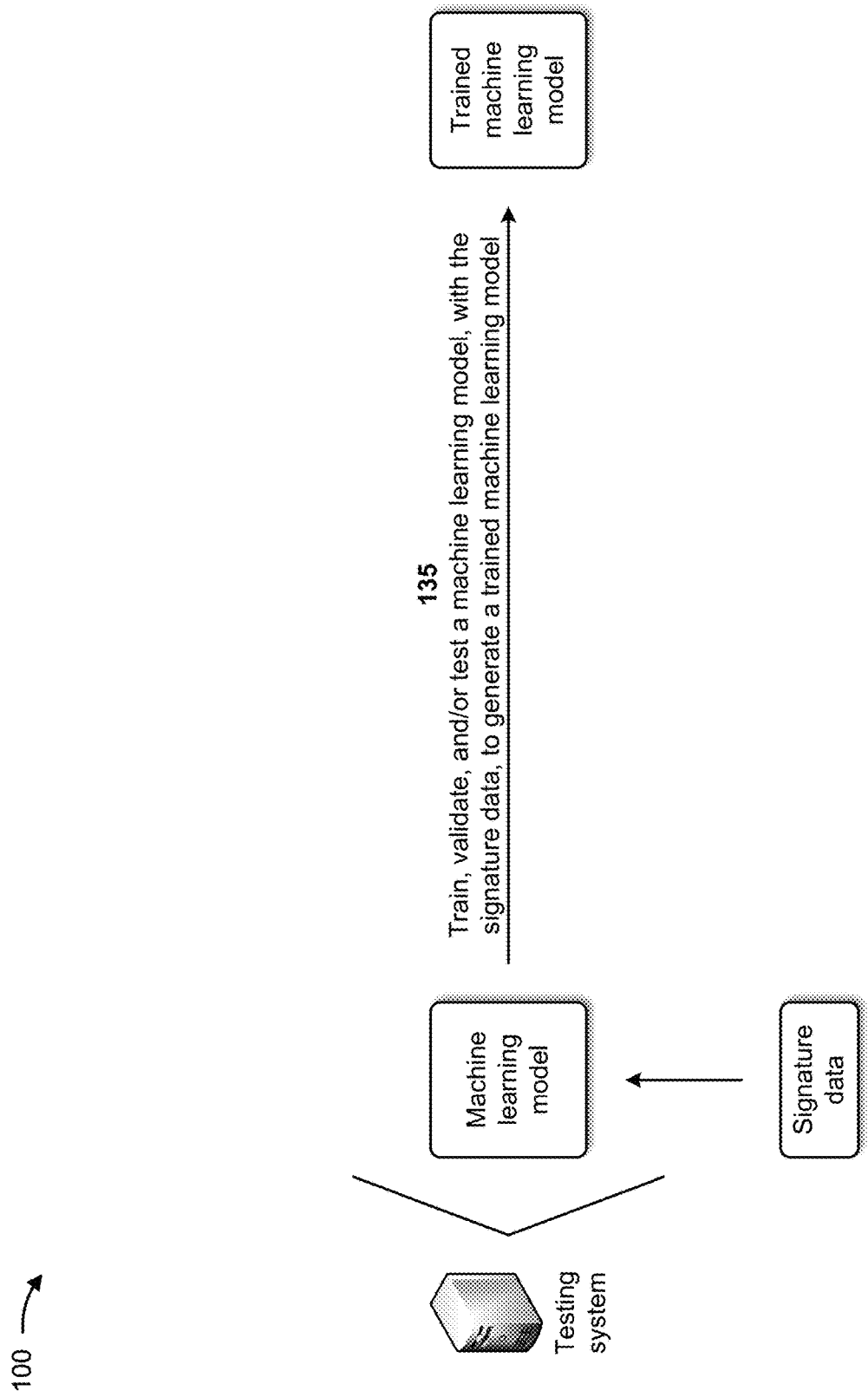

As shown in FIG. 1D, and by reference number 135, the testing system may train, validate, and/or test the machine learning model with the signature data to generate a trained machine learning model. For example, the testing system may divide the signature data into a first portion of signature data, a second portion of signature data, and a third portion of signature data. The first portion, the second portion, and the third portion may include a same quantity of the signature data, different quantities of the signature data, and/or the like. In some implementations, more of the signature data may be allotted to the first portion of signature data since the first portion may be utilized to generate the training data set for the machine learning model.

The testing system may generate a training dataset for the machine learning model based on the first portion of signature data. The testing system may generate a validation dataset for the machine learning model based on the second portion of signature data. The testing system may generate a test dataset for the machine learning model based on the third portion of signature data. In other implementations, the testing system may utilize different portions of the signature data to generate the training dataset, the validation dataset, and/or the test dataset for the machine learning model.

The testing system may train the machine learning model with the training dataset to generate the trained machine learning model. As described elsewhere herein, the machine learning model may be trained to process real time mobile radio data associated with a base station, and identify one or more behavior patterns in a coverage area of the base station. In some implementations, rather than training the machine learning model, the testing system may obtain the trained machine learning model from another system or device that trained the machine learning model. In this case, the testing system may provide the other system or device with the training dataset, the validation dataset, and/or the test dataset for use in training the machine learning model, and may provide the other system or device with updated training, validation, and/or test datasets to retrain the machine learning model in order to update the machine learning model.

In some implementations, the machine learning model may include a clustering model. A clustering model may use cluster analysis (also known as clustering) to perform machine learning. Cluster analysis is the task of grouping a set of objects in such a way that objects in the same group (called a cluster) are more similar (in some sense) to each other than to objects in other groups (clusters). Cluster analysis can be achieved by various algorithms that differ significantly in their notion of what constitutes a cluster and how to efficiently find them. Popular notions of clusters include groups with small distances between cluster members, dense areas of the data space, intervals or particular statistical distributions, and/or the like. Different cluster models (with correspondingly different cluster algorithms) may include connectivity models (e.g., where hierarchical clustering builds models based on distance connectivity), centroid models (e.g., where the k-means algorithm represents each cluster by a single mean vector), distribution models (e.g., where clusters are modeled using statistical distributions, such as multivariate normal distributions used by the expectation-maximization algorithm), density models (e.g., where clusters are defined as connected dense regions in the data space, and/or the like.

In some implementations, the testing system may train the machine learning model with the training dataset to generate the trained machine learning model, and may process the validation dataset, with the trained machine learning model, to validate that the trained machine learning model is operating correctly. If the trained machine learning model is operating correctly, the testing system may process the trained machine learning model, with the test dataset, to further ensure that the trained machine learning model is operating correctly. A trained machine learning model can be said to be operating correctly if it has adequate accuracy, has adequate precision, has adequate recall, is not subject to excessive overfitting, and/or the like. If the trained machine learning model is operating excessively incorrect, the testing system may modify the trained machine learning model and may revalidate and/or retest the modified machine learning model based on the validation dataset and/or the test dataset.

In some implementations, the trained machine learning model may be trained to determine behavior patterns that include characteristics representative of behaviors of the user devices in the mobile radio network. The behavior patterns may include user device trajectories (e.g., geolocations, movements, and/or the like) that follow particular paths with greater frequency than other paths, user device locations that cluster around particular locations with greater frequency than other locations, particular user device application, call, and/or data activity profiles that are followed with greater frequency than other profiles with activity intensity clustering around particular time periods, and geographies with greater frequency than other geographies. The behavior patterns may be statistical in nature, but with a degree of repeatability and/or predictability. The testing system may capture behavior patterns that have a predictable element, together with noise that is representative of real user devices and that is not available or properly represented with a purely deterministic behavior model and noise that presents an opportunity for the machine learning model to learn information that is not available or properly represented with a purely stochastic behavior model.

A behavior pattern may represent exemplary behavior for an individual user device in the mobile radio network. Alternatively, a behavior pattern may represent a statistical distribution for groups consisting of multiple user devices. The user devices may be classified into one or more behavior patterns based on commonality in behaviors. Respective population size in each group within a locality and a time period may be influenced by or correlate with a quantity of factors, such as a classification type of the mobile radio network (e.g., rural, urban, dense urban, transport hub, urban park, suburban, or the like), demographic factors (e.g., a population living in the geographical location, transit the geographical location, shopping in the geographical location, work sites in the geographical location, and/or the like). The behavior patterns and the population size within each group following a pattern may vary for different times of the day, days of the week, seasons of the year, or in response to particular events.

The testing system may determine the behavior patterns based on information related to the mobile radio network, such as maps, models, and/or photographs of the geographical location, demographics of the population working and living within the geographical location, building locations in the geographical location, shape and usage of the buildings in the geographical location, shape, density, classification and/or usage of roads in the geographical location, and/or the like. Determination of the factors that influence or correlate with the population size within each behavior pattern and the behavioral characteristics of each behavior pattern may support generalization of behaviors determined in one mobile radio network to behaviors likely to be found in other mobile radio networks.

In some implementations, the testing system may determine the behavior patterns based on analysis of data characterizing user behavior patterns taken from real network deployments. The characterizing data may include, for example, measurements of radio signal quality, radio signal strength, used applications, characteristics of the mobile radio network, demographic information, and/or the like. The testing system may utilize the characterizing data as training data for the machine learning model. In some implementations, the testing may generalize the behavior patterns of the mobile radio network to determine representative predictions of behavior patterns for other mobile radio networks. The testing system may generalize the behavior patterns based on the identified influencing/correlation factors determined in the mobile radio network and applied to another mobile radio network. In some implementations, a base station with the machine learning model may determine the behavior pattern based on real network data and may utilize the behavior patterns to predict future behavior for one or more user devices. This may optimize the base station and other network infrastructure in preparation for future user behavior.

Figure 1E:
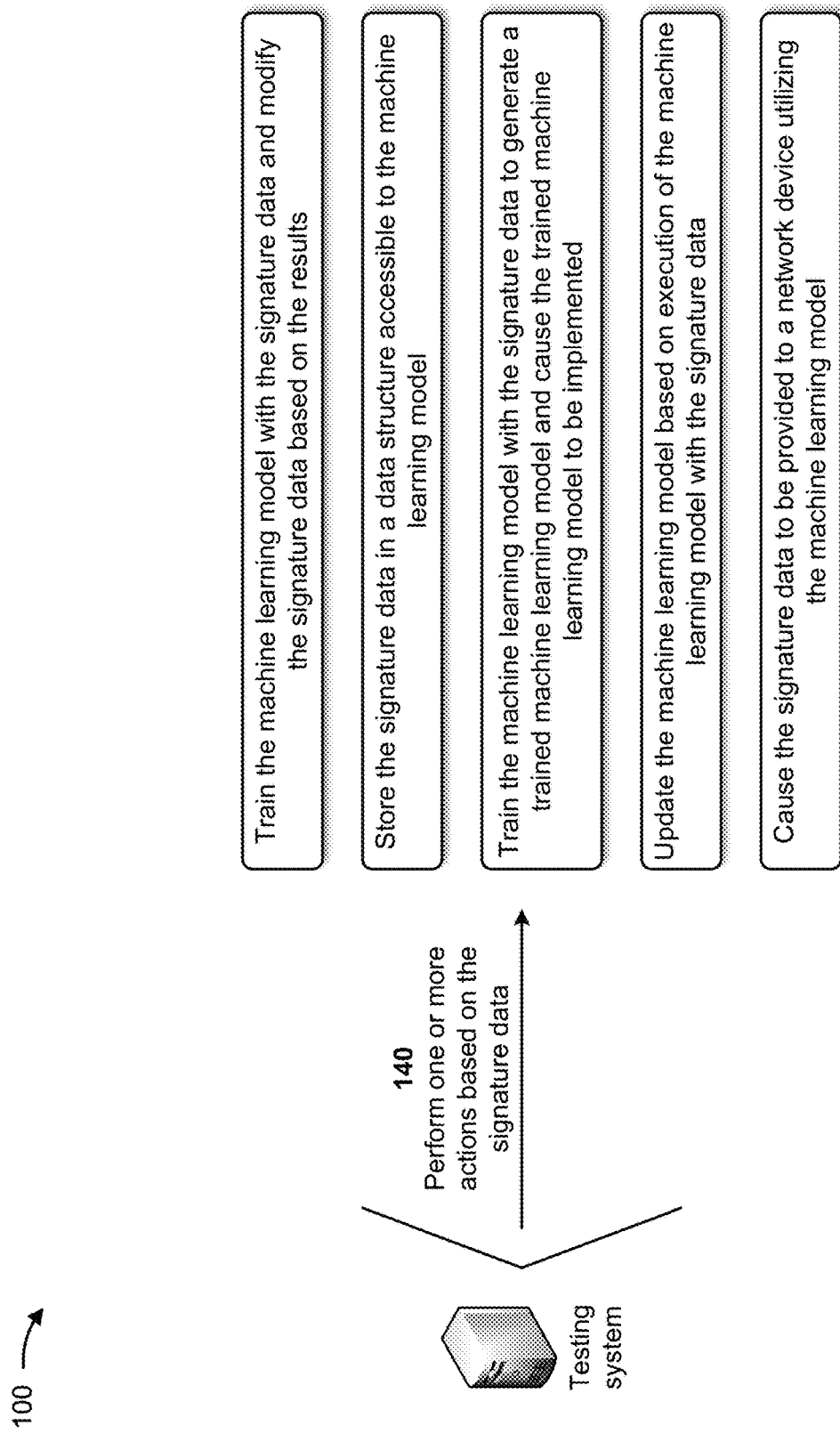

As shown in FIG. 1E, and by reference number 140, the testing system may perform one or more actions based on the signature data. In some implementations, performing the one or more actions includes the testing system training the machine model with the signature data to generate results and modifying the signature data based on the results. For example, the testing system may train the machine learning model with the signature data, and the machine learning model may produce predictions (e.g., results) based on training the machine learning model. The testing system may utilize the predictions to modify and improve the signature data. In this way, the testing system conserves computing resources, networking resources, and/or the like that would otherwise have been consumed in utilizing an insufficiently realistic user behavior simulation technique, incorrectly identifying user behavior associated with a base station that includes a RIC and a machine learning model, incorrectly making incorrect modifications to the base station based on the incorrectly identified user behavior, discovering and correcting the incorrect modifications to the base station, and/or the like.

In some implementations, performing the one or more actions includes the testing system storing the signature data in a data structure accessible to the machine learning model. For example, the testing system may store the signature data in a data structure so that the machine learning model (e.g., provided in a base station) may access and utilize the signature data to train, validate, and/or test the machine learning model. In this way, the testing system conserves computing resources, networking resources, and/or the like that would otherwise have been consumed in incorrectly identifying user behavior associated with a base station that includes a RIC and a machine learning model, incorrectly making incorrect modifications to the base station based on the incorrectly identified user behavior, discovering and correcting the incorrect modifications to the base station, and/or the like.

In some implementations, performing the one or more actions includes the testing system training the machine learning model with the signature data to generate a trained machine learning model and causing the trained machine learning model to be implemented. For example, the testing system may train the machine learning model with the signature data and may cause a base station to implement the trained machine learning model with real time mobile radio data. The base station may process the real time mobile radio data, with the trained machine learning model, to make predictions associated with user behavior within a coverage area of the base station. In this way, the testing system conserves computing resources, networking resources, and/or the like that would otherwise have been consumed in utilizing an insufficiently realistic user behavior simulation technique, incorrectly identifying user behavior associated with a base station that includes a RIC and a machine learning model, and/or the like.

In some implementations, performing the one or more actions includes the testing system updating the machine learning model based on execution of the machine learning model with the signature data. For example, the testing system may process the signature data with the machine learning model to generate predictions. The testing system may determine that the predictions are incorrect and may modify or update the machine learning model based on the incorrect predictions. In this way, the testing system conserves computing resources, networking resources, and/or the like that would otherwise have been consumed in incorrectly identifying user behavior associated with a base station that includes a RIC and a machine learning model, incorrectly making incorrect modifications to the base station based on the incorrectly identified user behavior, discovering and correcting the incorrect modifications to the base station, and/or the like.

In some implementations, performing the one or more actions includes the testing system causing the signature data to be provided to a network device utilizing the machine learning model. For example, the testing system may provide the signature data to a base station utilizing the machine learning model. The base station may train the machine learning model, with the signature data, to generate the trained machine learning model. The base station may process real time mobile radio data, with the trained machine learning model, to make predictions associated with user behavior within a coverage area of the base station. In this way, the testing system conserves computing resources, networking resources, and/or the like that would otherwise have been consumed in utilizing an insufficiently realistic user behavior simulation technique, incorrectly identifying user behavior associated with a base station that includes a RIC and a machine learning model, incorrectly making incorrect modifications to the base station based on the incorrectly identified user behavior, discovering and correcting the incorrect modifications to the base station, and/or the like.

Figure 1F:
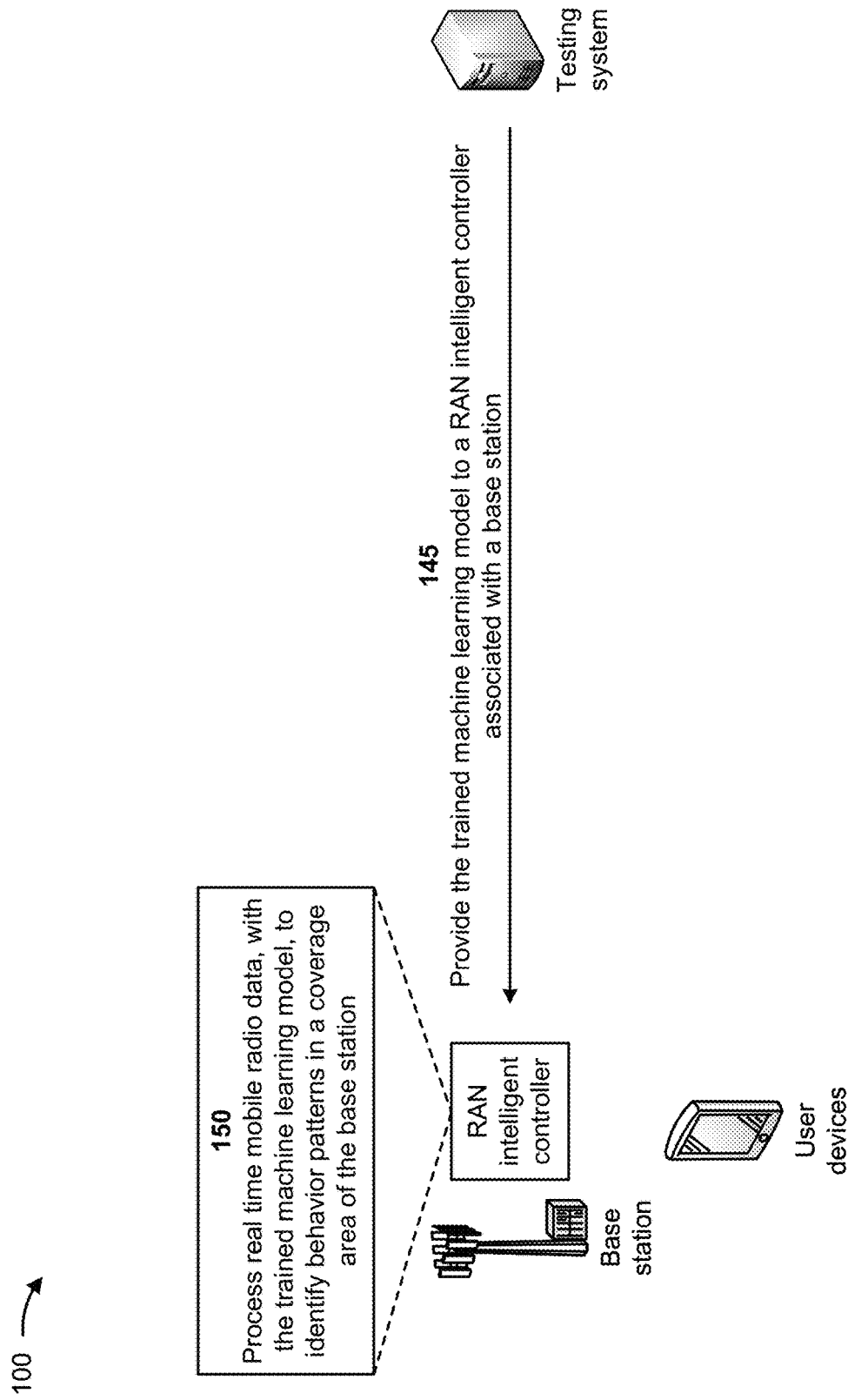

As shown in FIG. 1F, and by reference number 145, the testing system may provide the trained machine learning model to a RAN intelligent controller associated with a particular base station. For example, the testing system may provide the trained machine learning model to a network device (e.g., a base station) associated with real time mobile radio data. The base station may include a RAN intelligent controller that receives and stores the trained machine learning model. In some implementations, the machine learning model may be stored in the RAN intelligent controller, and the testing system may provide the signature data to the RAN intelligent controller. In such implementations, the RAN intelligent controller may train the machine learning model, with the signature data, to generate the trained machine learning model.

As further shown in FIG. 1F, and by reference number 150, the RAN intelligent controller may process real time mobile radio data, with the trained machine learning model, to identify behavior patterns in a coverage area of the particular base station. For example, the base station may provide a coverage area for a geographical location that includes user devices. The base station may receive real time mobile radio data from the coverage area and may provide the real time mobile radio data to the RAN intelligent controller. The RAN intelligent controller may process the real time mobile radio data, with the trained machine learning model, to identify the behavior patterns of users (e.g., the user devices) in the coverage area of the base station.

The trained machine learning model may enable the RAN intelligent controller to create a simulation space that includes discoverable signatures (e.g., the signature data) representative of the behavior patterns in the coverage area. The RAN intelligent controller may utilize the discoverable signatures to process the real time mobile radio data (e.g., measurement and/or KPI data) and to identify the behavior patterns. The trained machine learning model may process the real time mobile radio data and may detect signatures in the real time mobile radio data that are representative of location dependent modifications to received signals (e.g., identifying behavior patterns). The RAN intelligent controller may utilize the identified behavior patterns to detect locations of user devices more accurately and/or to determine performance enhancements and/or optimizations for the base station.

For example, the RAN intelligent controller may utilize measurements of signal quality and performance KPIs, associated with the base station, to improve signal quality generated by the base station by modifying settings for transmission power, base station antenna tilt, change of serving cell, change of serving frequency band layer, handover and reselection parameters, allocation and retention parameters, pilot power/reference signal levels and associated offsets, admission control parameters, allocation of resources and priority to one or more slices, and/or the like. In this way, the RAN intelligent controller may estimate impacts of machine learning model-identified behavior patterns on performance of the base station, and may generate recommendations to improve performance of the base station.

In some implementations, the testing system may aid in a design and development of the machine learning model (e.g., an application, such as an xApp, an rApp, and/or the like), in a performance evaluation of the machine learning model, in a determination of an expected impact on system performance of a recommendation provided by the machine learning model, and/or the like. The trained machine learning model may enable an accurate estimate of a location of a user device to be determined by the RAN intelligent controller, which may improve system performance for the user device (e.g., compared to a user device location estimate derived simply from an average signal strength).

The RAN intelligent controller may utilize the machine learning model to identify a behavior pattern representing a current and expected behavior of one or more user devices in a statistical manner, and to use pattern matching to map a particular user device to an expected pattern based, for example, on a preceding behavior, thereby increasing an ability to predict future conditions of the mobile radio network and a state for the user device. Such predictions may be made irrespective of any knowledge of an identity of the user device. Alternatively, if a subscriber identity is available, the RAN intelligent controller may define patterns, groupings, and associated matching to patterns with greater granularity and accuracy. Specifically, the subscriber identity may provide significant predictive power for a future behavior of the user device.

A trajectory of a user device may be influenced by buildings and terrain and may include components dependent on location and time such that, for a start point and an end point, a common route, or one of a few routes, may be used by the user device. Additionally, due to the constraints of the mobile radio network, segments of routes with different start and end points may share part of a same trajectory. Additionally, some end points and start points may be associated with higher attractiveness and more user device may utilize the associated trajectories. Special events, such as sporting events, may increase an attractiveness of a given location for a class of user devices for a period of time.

A user device activity profile may include a time and location dependent components that reflect a behavior pattern of a subscriber or a group of subscribers. Consequently, the testing system may identify the time/location components and may predict other parameters based on the one or more behavior patterns in the time/location components are classified. For example, identification of the time/location components may enable calculation of a geolocation of a user device, or prediction of a future performance of the mobile radio network.

In some implementations, the testing system may evaluate models other than machine learning models. For example, if new xApp is to improve performance by triggering handover, the xApp may reduce failed handovers by 10%. The testing system may be utilized to test a handover success rate of a generic xApp that triggers handovers with a simple decision based on relative thresholds, and to test a handover success rate of the new xApp. The testing system may then determine whether the failed handovers are reduced by 10% based on the handover success rates. In another example, the testing system may not compare the new xApp to the generic xApp, but may evaluate a performance of the new xApp. Thus, the testing system may generate the signature data for performing a comparison between two models, for performing an evaluation of a model, for training a machine learning model, and/or the like.

In some implementations, the testing system may receive statistical parameters characteristic of user behavior in a mobile radio network in a geographical area, and may generate, based on the statistical parameters, signature data that includes time and location dependent user behavior patterns for user behavior in the geographical area. In some implementations, the testing system may receive mobile radio data identifying measurements between the base stations and the user devices representing user behavior and respective geolocations, in a geographical area, and may determine, from the mobile radio data, statistical parameters characteristic of user behavior in a mobile radio network in the geographical area. In some implementations, the testing system may receive, terrain and building map data and/or photographic data for a mobile radio network in a geographic area, and/or demographic and building usage data, and may determine, from the terrain and building map data and/or the photographic data, and/or the demographic and building usage data, statistical parameters characteristic of user behavior in the mobile radio network. In some implementations, the testing system may implement the machine learning model in a base station associated with a mobile radio network, and may train the machine learning model based on mobile radio data received from mobile radio network and/or from demographic and building usage data associated with the geographic area. The base station may be configured to utilize the machine learning model to predict an impact of system changes and to identify possible performance degradation before a change in system configuration is implemented.

In this way, the testing system utilizes invariant user behavior data for training a machine learning model. The testing system may generate signature data that include invariant user behavior patterns with a degree of random variation. The signature data may include a user behavior that represent different user operation modes (e.g., peak hour, steady state, holiday, nighttime, a sporting event, and/or the like) of a mobile radio network. The user behavior may also represent changes between the different user operation modes, anomalous events where users congregate in areas different than a steady state behavior, and/or the like. The testing system may utilize the signature data to train a machine learning model utilized by a base station to identify user behavior patterns associated with the base station. This, in turn, conserves computing resources, networking resources, and/or the like that would otherwise have been consumed in utilizing an insufficiently realistic user behavior simulation technique, incorrectly identifying user behavior associated with a base station that includes a RIC and a machine learning model, incorrectly making incorrect modifications to the base station based on the incorrectly identified user behavior, discovering and correcting the incorrect modifications to the base station, and/or the like.

As indicated above, FIGS. 1A-1F are provided as an example. Other examples may differ from what is described with regard to FIGS. 1A-1F. The number and arrangement of devices shown in FIGS. 1A-1F are provided as an example. In practice, there may be additional devices, fewer devices, different devices, or differently arranged devices than those shown in FIGS. 1A-1F. Furthermore, two or more devices shown in FIGS. 1A-1F may be implemented within a single device, or a single device shown in FIGS. 1A-1F may be implemented as multiple, distributed devices. Additionally, or alternatively, a set of devices (e.g., one or more devices) shown in FIGS. 1A-1F may perform one or more functions described as being performed by another set of devices shown in FIGS. 1A-1F.

Figure 2:
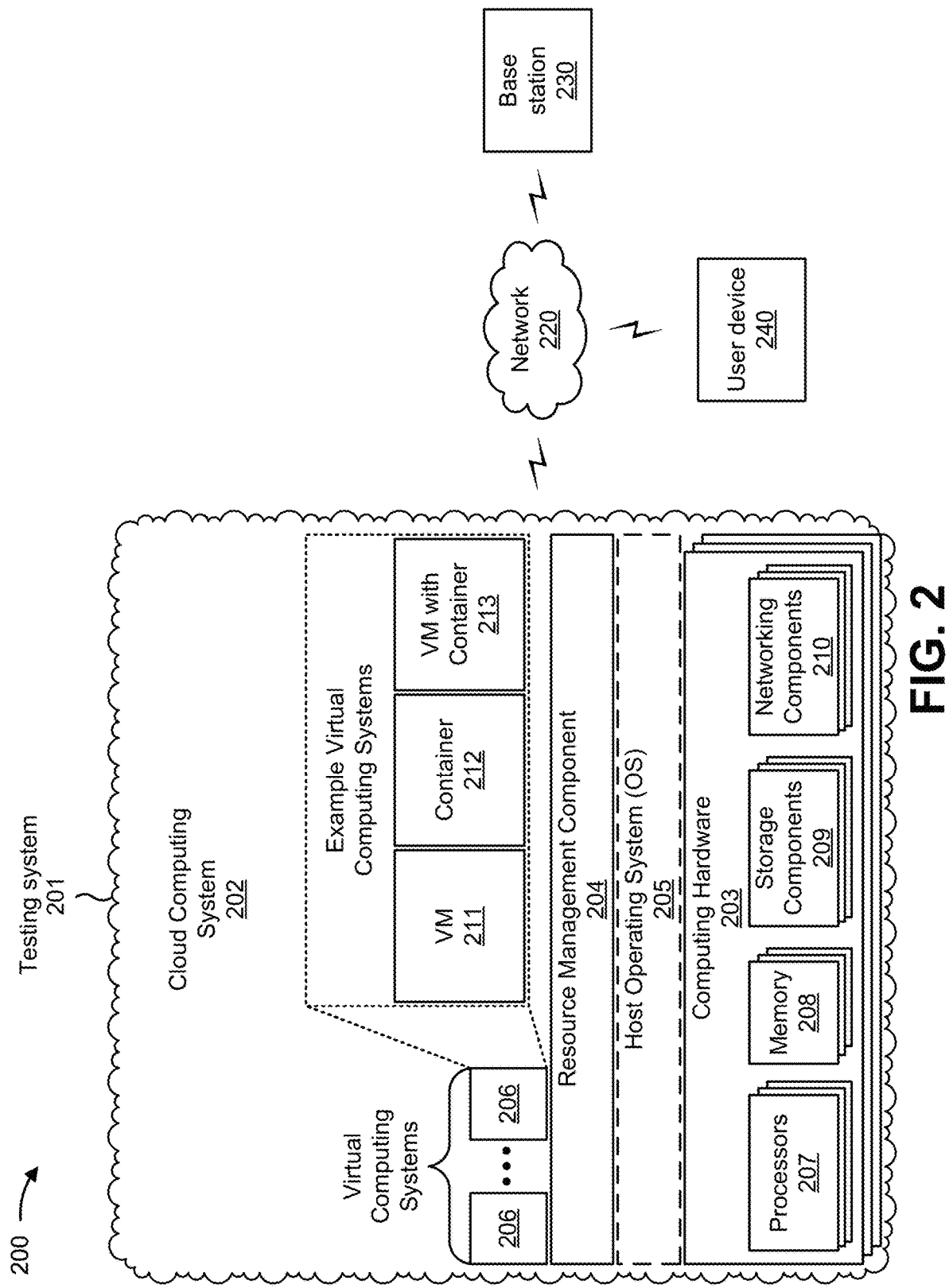
FIG. 2 is a diagram of an example environment in which systems and/or methods described herein may be implemented.

FIG. 2 is a diagram of an example environment 200 in which systems and/or methods described herein may be implemented. As shown in FIG. 2, the environment 200 may include a testing system 201, which may include one or more elements of and/or may execute within a cloud computing system 202. The cloud computing system 202 may include one or more elements 203-213, as described in more detail below. As further shown in FIG. 2, the environment 200 may include a network 220, a base station 230, and/or a user device 240. Devices and/or elements of the environment 200 may interconnect via wired connections and/or wireless connections.

The cloud computing system 202 includes computing hardware 203, a resource management component 204, a host operating system (OS) 205, and/or one or more virtual computing systems 206. The resource management component 204 may perform virtualization (e.g., abstraction) of the computing hardware 203 to create the one or more virtual computing systems 206. Using virtualization, the resource management component 204 enables a single computing device (e.g., a computer, a server, and/or the like) to operate like multiple computing devices, such as by creating multiple isolated virtual computing systems 206 from the computing hardware 203 of the single computing device. In this way, the computing hardware 203 can operate more efficiently, with lower power consumption, higher reliability, higher availability, higher utilization, greater flexibility, and lower cost than using separate computing devices.

The computing hardware 203 includes hardware and corresponding resources from one or more computing devices. For example, the computing hardware 203 may include hardware from a single computing device (e.g., a single server) or from multiple computing devices (e.g., multiple servers), such as multiple computing devices in one or more data centers. As shown, the computing hardware 203 may include one or more processors 207, one or more memories 208, one or more storage components 209, and/or one or more networking components 210. Examples of a processor, a memory, a storage component, and a networking component (e.g., a communication component) are described elsewhere herein.

The resource management component 204 includes a virtualization application (e.g., executing on hardware, such as the computing hardware 203) capable of virtualizing the computing hardware 203 to start, stop, and/or manage the one or more virtual computing systems 206. For example, the resource management component 204 may include a hypervisor (e.g., a bare-metal or Type 1 hypervisor, a hosted or Type 2 hypervisor, and/or the like) or a virtual machine monitor, such as when the virtual computing systems 206 are virtual machines 211. Additionally, or alternatively, the resource management component 204 may include a container manager, such as when the virtual computing systems 206 are containers 212. In some implementations, the resource management component 204 executes within and/or in coordination with a host operating system 205.

A virtual computing system 206 includes a virtual environment that enables cloud-based execution of operations and/or processes described herein using computing hardware 203. As shown, the virtual computing system 206 may include a virtual machine 211, a container 212, a hybrid environment 213 that includes a virtual machine and a container, and/or the like. A virtual computing system 206 may execute one or more applications using a file system that includes binary files, software libraries, and/or other resources required to execute applications on a guest operating system (e.g., within the virtual computing system 206) or the host operating system 205.

Although the testing system 201 may include one or more elements 203-213 of the cloud computing system 202, may execute within the cloud computing system 202, and/or may be hosted within the cloud computing system 202, in some implementations, the testing system 201 may not be cloud-based (e.g., may be implemented outside of a cloud computing system) or may be partially cloud-based. For example, the testing system 201 may include one or more devices that are not part of the cloud computing system 202, such as a device 300 of FIG. 3, which may include a standalone server or another type of computing device. The testing system 201 may perform one or more operations and/or processes described in more detail elsewhere herein.

The network 220 includes one or more wired and/or wireless networks. For example, the network 220 may include a cellular network, a public land mobile network (PLMN), a local area network (LAN), a wide area network (WAN), a private network, the Internet, and/or the like, and/or a combination of these or other types of networks. The network 220 enables communication among the devices of the environment 200.

The base station 230 may support, for example, a cellular radio access technology (RAT). The base station may include one or more base stations (e.g., base transceiver stations, radio base stations, node Bs, eNodeBs (eNBs), gNodeBs (gNBs), base station subsystems, cellular sites, cellular towers, access points, transmit receive points (TRPs), radio access nodes, macrocell base stations, microcell base stations, picocell base stations, femtocell base stations, or similar types of devices) and other network entities that can support wireless communication for the user device 240. The base station 230 may transfer traffic between the user device 240 (e.g., using a cellular RAT), one or more base stations (e.g., using a wireless interface or a backhaul interface, such as a wired backhaul interface), and/or a core network. The base station 230 may provide one or more cells that cover geographic areas.

The user device 240 includes one or more devices capable of receiving, generating, storing, processing, and/or providing information, as described elsewhere herein. The user device 240 may include a communication device and/or a computing device. For example, the user device 240 may include a wireless communication device, a mobile phone, a user equipment, a laptop computer, a tablet computer, a desktop computer, a gaming console, a set-top box, a wearable communication device (e.g., a smart wristwatch, a pair of smart eyeglasses, a head mounted display, or a virtual reality headset), or a similar type of device.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of the environment 200 may perform one or more functions described as being performed by another set of devices of the environment 200.

Figure 3:
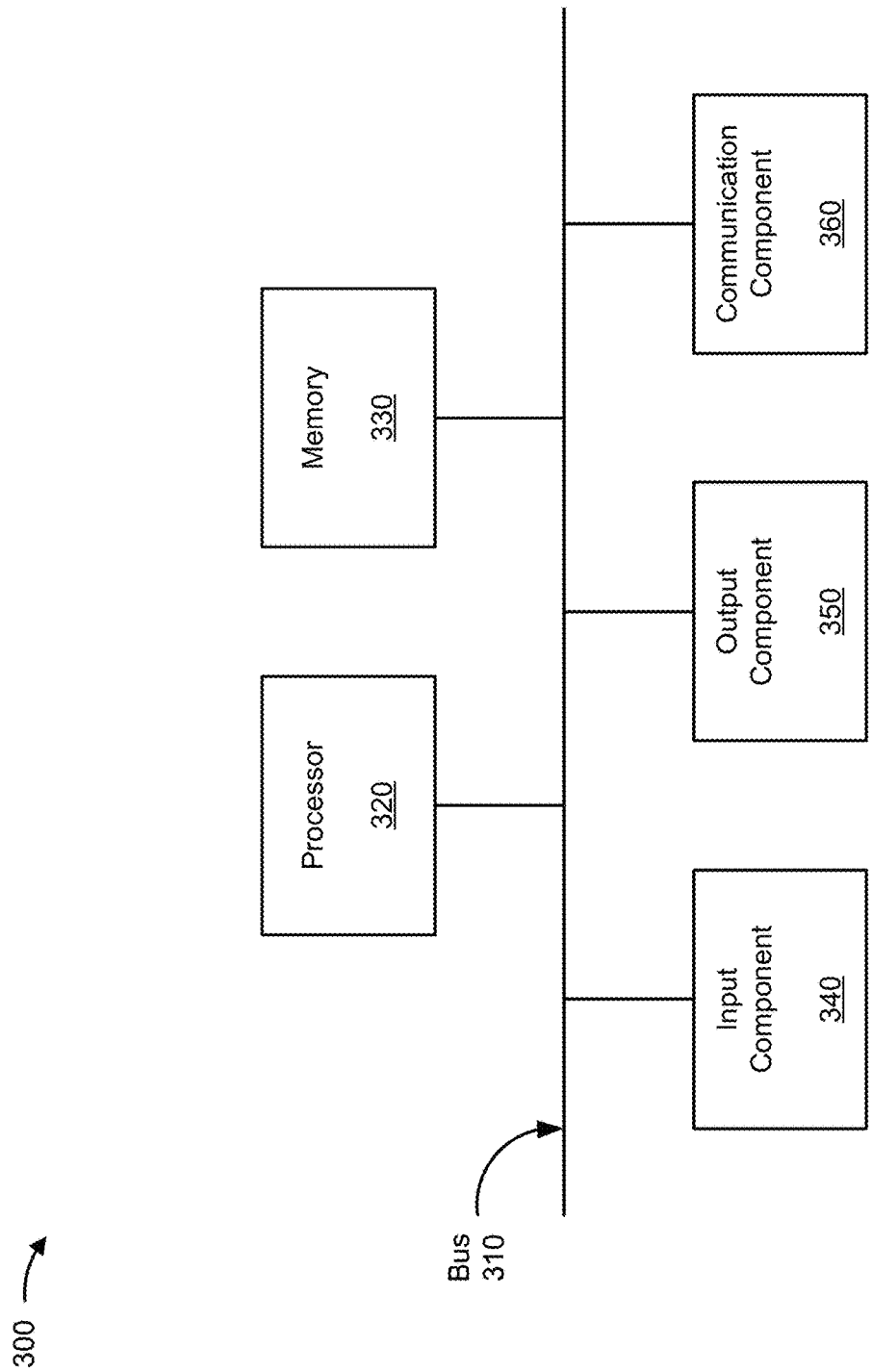
FIG. 3 is a diagram of example components of one or more devices of FIG. 2.

FIG. 3 is a diagram of example components of a device 300, which may correspond to the testing system 201, the base station 230, and/or the user device 240. In some implementations, the testing system 201, the base station 230, and/or the user device 240 may include one or more devices 300 and/or one or more components of the device 300. As shown in FIG. 3, the device 300 may include a bus 310, a processor 320, a memory 330, an input component 340, an output component 350, and a communication interface 360.

The bus 310 includes one or more components that enable wired and/or wireless communication among the components of the device 300. The bus 310 may couple together two or more components of FIG. 3, such as via operative coupling, communicative coupling, electronic coupling, and/or electric coupling. The processor 320 includes a central processing unit, a graphics processing unit, a microprocessor, a controller, a microcontroller, a digital signal processor, a field-programmable gate array, an application-specific integrated circuit, and/or another type of processing component. The processor 320 is implemented in hardware, firmware, or a combination of hardware and software. In some implementations, the processor 320 includes one or more processors capable of being programmed to perform one or more operations or processes described elsewhere herein.

The memory 330 includes volatile and/or nonvolatile memory. For example, the memory 330 may include random access memory (RAM), read only memory (ROM), a hard disk drive, and/or another type of memory (e.g., a flash memory, a magnetic memory, and/or an optical memory). The memory 330 may include internal memory (e.g., RAM, ROM, or a hard disk drive) and/or removable memory (e.g., removable via a universal serial bus connection). The memory 330 may be a non-transitory computer-readable medium. The memory 330 stores information, instructions, and/or software (e.g., one or more software applications) related to the operation of the device 300. In some implementations, the memory 330 includes one or more memories that are coupled to one or more processors (e.g., the processor 320), such as via the bus 310.

The input component 340 enables the device 300 to receive input, such as user input and/or sensed input. For example, the input component 340 may include a touch screen, a keyboard, a keypad, a mouse, a button, a microphone, a switch, a sensor, a global positioning system sensor, an accelerometer, a gyroscope, and/or an actuator. The output component 350 enables the device 300 to provide output, such as via a display, a speaker, and/or a light-emitting diode. The communication interface 360 enables the device 300 to communicate with other devices via a wired connection and/or a wireless connection. For example, the communication interface 360 may include a receiver, a transmitter, a transceiver, a modem, a network interface card, and/or an antenna.

The device 300 may perform one or more operations or processes described herein. For example, a non-transitory computer-readable medium (e.g., the memory 330) may store a set of instructions (e.g., one or more instructions or code) for execution by the processor 320. The processor 320 may execute the set of instructions to perform one or more operations or processes described herein. In some implementations, execution of the set of instructions, by one or more processors 320, causes the one or more processors 320 and/or the device 300 to perform one or more operations or processes described herein. In some implementations, hardwired circuitry may be used instead of or in combination with the instructions to perform one or more operations or processes described herein. Additionally, or alternatively, the processor 320 may be configured to perform one or more operations or processes described herein. Thus, implementations described herein are not limited to any specific combination of hardware circuitry and software.

The number and arrangement of components shown in FIG. 3 are provided as an example. The device 300 may include additional components, fewer components, different components, or differently arranged components than those shown in FIG. 3. Additionally, or alternatively, a set of components (e.g., one or more components) of the device 300 may perform one or more functions described as being performed by another set of components of the device 300.

Figure 4:
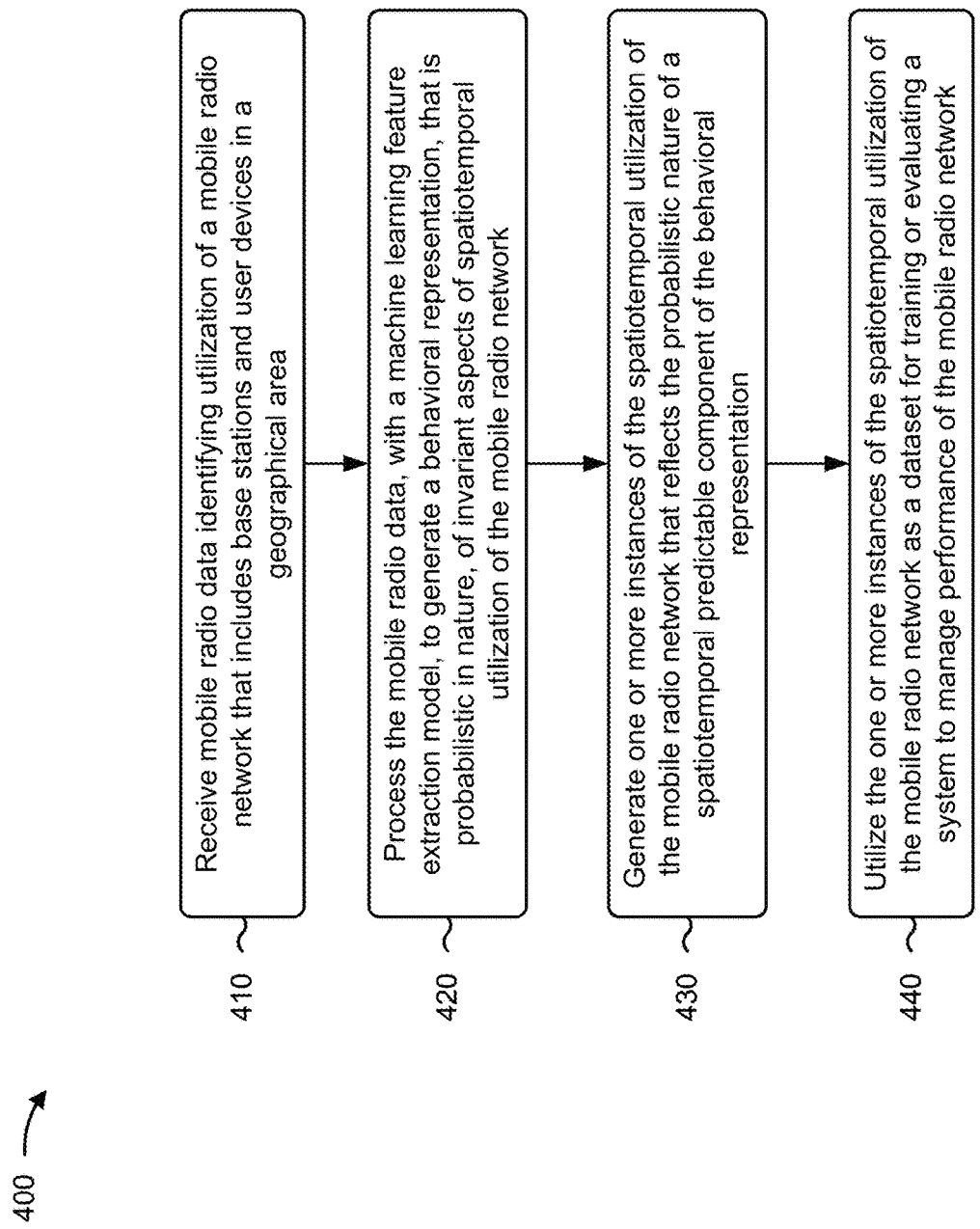
FIG. 4 is a flowchart of an example process for utilizing invariant user behavior data for training a machine learning model.

FIG. 4 is a flowchart of an example process 400 for utilizing invariant user behavior data for training a machine learning model. In some implementations, one or more process blocks of FIG. 4 may be performed by a device (e.g., the testing system 201). In some implementations, one or more process blocks of FIG. 4 may be performed by another device or a group of devices separate from or including the device. Additionally, or alternatively, one or more process blocks of FIG. 4 may be performed by one or more components of the device 300, such as the processor 320, the memory 330, the input component 340, the output component 350, and/or the communication interface 360.

As shown in FIG. 4, process 400 may include receiving mobile radio data identifying utilization of a mobile radio network that includes base stations and user devices in a geographical area (block 410). For example, the device may receive mobile radio data identifying utilization of a mobile radio network that includes base stations and user devices in a geographical area, as described above.

As further shown in FIG. 4, process 400 may include processing the mobile radio data, with a machine learning feature extraction model, to generate a behavioral representation, that is probabilistic in nature, of invariant aspects of spatiotemporal utilization of the mobile radio network (block 420). For example, the device may process the mobile radio data, with a machine learning feature extraction model, to generate a behavioral representation, that is probabilistic in nature, of invariant aspects of spatiotemporal utilization of the mobile radio network, as described above.

As further shown in FIG. 4, process 400 may include generating one or more instances of the spatiotemporal utilization of the mobile radio network that reflects the probabilistic nature of a spatiotemporal predictable component of the behavioral representation (block 430). For example, the device may generate one or more instances of the spatiotemporal utilization of the mobile radio network that reflects the probabilistic nature of a spatiotemporal predictable component of the behavioral representation, as described above.

As further shown in FIG. 4, process 400 may include utilizing the one or more instances of the spatiotemporal utilization of the mobile radio network as a dataset for training or evaluating a system to manage performance of the mobile radio network (block 440). For example, the device may utilize the one or more instances of the spatiotemporal utilization of the mobile radio network as a dataset for training or evaluating a system to manage performance of the mobile radio network, as described above.

In some implementations, process 400 includes receiving supplemental data that includes geographical data identifying a classification of the mobile radio network, obstruction data, network topology data, and demographic data associated with the geographical area, and generating random obstruction probability data based on the geographical data. In some implementations, process 400 includes generating angle dependent fast fading data based on the mobile radio data, and adding the random obstruction probability data and the angle dependent fast fading data to the spatiotemporal predictable component of the behavioral representation to generate signature data identifying a realistic discoverable spatiotemporal behavioral and fading signature.

In some implementations, process 400 includes generating a validation dataset based on the one or more instances of the spatiotemporal utilization of the mobile radio network, and validating the system with the validation dataset. In some implementations, process 400 includes generating a test dataset based on the one or more instances of the spatiotemporal utilization of the mobile radio network, and testing the system with the test dataset.

In some implementations, process 400 includes training the machine learning feature extraction model with the one or more instances of the spatiotemporal utilization of the mobile radio network to generate results, and modifying system performance parameters of the system based on the results. In some implementations, process 400 includes causing the one or more instances of the spatiotemporal utilization of the mobile radio network to be implemented by an optimization component collocated with a network device associated with the mobile radio network, wherein the optimization component is configured to utilize the one or more instances of the spatiotemporal utilization of the mobile radio network to identify behavior patterns associated with users in a coverage area of the network device.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

The foregoing disclosure provides illustration and description but is not intended to be exhaustive or to limit the implementations to the precise form disclosed. Modifications may be made in light of the above disclosure or may be acquired from practice of the implementations.

As used herein, the term "component" is intended to be broadly construed as hardware, firmware, or a combination of hardware and software. It will be apparent that systems and/or methods described herein may be implemented in different forms of hardware, firmware, and/or a combination of hardware and software. The actual specialized control hardware or software code used to implement these systems and/or methods is not limiting of the implementations. Thus, the operation and behavior of the systems and/or methods are described herein without reference to specific software code—it being understood that software and hardware can be used to implement the systems and/or methods based on the description herein.

As used herein, satisfying a threshold may, depending on the context, refer to a value being greater than the threshold, greater than or equal to the threshold, less than the threshold, less than or equal to the threshold, equal to the threshold, and/or the like, depending on the context.

Although particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set.

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, a combination of related and unrelated items, and/or the like), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

In the preceding specification, various example embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

What is claimed is:

1. A method, comprising:
   receiving, by a device, mobile radio data identifying utilization of a mobile radio network that includes base stations and user devices in a geographical area;
   processing, by the device, the mobile radio data, with a machine learning feature extraction model, to generate a behavioral representation, that is probabilistic in nature, of invariant aspects of spatiotemporal utilization of the mobile radio network;
   generating, by the device, one or more instances of the spatiotemporal utilization of the mobile radio network that reflects the probabilistic nature of a spatiotemporal predictable component of the behavioral representation;
   utilizing, by the device, the one or more instances of the spatiotemporal utilization of the mobile radio network as a dataset for training or evaluating a system to manage performance of the mobile radio network;
   generating random obstruction probability data based on geographical data;
   generating angle dependent fast fading data based on the mobile radio data; and
   adding the random obstruction probability data and the angle dependent fast fading data to the spatiotemporal predictable component of the behavioral representation to generate signature data identifying a realistic discoverable spatiotemporal behavioral and fading signature.

2. The method of claim 1, wherein the geographical data identifies classification data of the mobile radio network, obstruction data, network topology data, and demographic data associated with the geographical area.

3. The method of claim 1, further comprising:
   generating a validation dataset based on the one or more instances of the spatiotemporal utilization of the mobile radio network; and
   validating the system with the validation dataset.

4. The method of claim 1, further comprising:
   generating a test dataset based on the one or more instances of the spatiotemporal utilization of the mobile radio network; and
   testing the system with the test dataset.

5. The method of claim 1, further comprising:
   training the machine learning feature extraction model with the one or more instances of the spatiotemporal utilization of the mobile radio network to generate results; and
   modifying system performance parameters of the system based on the results.

6. The method of claim 1, further comprising:
   causing the one or more instances of the spatiotemporal utilization of the mobile radio network to be implemented by an optimization component collocated with a network device associated with the mobile radio network,
   wherein the optimization component is configured to utilize the one or more instances of the spatiotemporal utilization of the mobile radio network to identify behavior patterns associated with users in a coverage area of the network device.

7. A device, comprising:
   one or more memories; and
   one or more processors, coupled to the one or more memories, configured to:
      receive mobile radio data identifying utilization of a mobile radio network that includes base stations and user devices in a geographical area;
      process the mobile radio data, with a machine learning feature extraction model, to generate a behavioral representation, that is probabilistic in nature, of invariant aspects of spatiotemporal utilization of the mobile radio network;
      generate one or more instances of the spatiotemporal utilization of the mobile radio network that reflects the probabilistic nature of a spatiotemporal predictable component of the behavioral representation;

utilize the one or more instances of the spatiotemporal utilization of the mobile radio network as a dataset for training or evaluating a system to manage performance of the mobile radio network;

generate random obstruction probability data based on geographical data;

generate angle dependent fast fading data based on the mobile radio data; and add the random obstruction probability data and the angle dependent fast fading data to the spatiotemporal predictable component of the behavioral representation to generate signature data identifying a realistic discoverable spatiotemporal behavioral and fading signature.

8. The device of claim 7, wherein the geographical data identifies classification data of the mobile radio network, obstruction data, network topology data, and demographic data associated with the geographical area.

9. The device of claim 7, wherein the one or more processors are further configured to:

generate a validation dataset based on the one or more instances of the spatiotemporal utilization of the mobile radio network; and validate the system with the validation dataset.

10. The device of claim 7, wherein the one or more processors are further configured to:

generate a test dataset based on the one or more instances of the spatiotemporal utilization of the mobile radio network; and test the system with the test dataset.

11. The device of claim 7, wherein the one or more processors are further configured to:

train the machine learning feature extraction model with the one or more instances of the spatiotemporal utilization of the mobile radio network to generate results; and modify system performance parameters of the system based on the results.

12. The device of claim 7, wherein the one or more processors are further configured to:

cause the one or more instances of the spatiotemporal utilization of the mobile radio network to be implemented by an optimization component collocated with a network device associated with the mobile radio network, wherein the optimization component is configured to utilize the one or more instances of the spatiotemporal utilization of the mobile radio network to identify behavior patterns associated with users in a coverage area of the network device.

13. A non-transitory computer-readable medium storing a set of instructions, the set of instructions comprising:

one or more instructions that, when executed by one or more processors of a device, cause the device to:

receive mobile radio data identifying utilization of a mobile radio network that includes base stations and user devices in a geographical area;

process the mobile radio data, with a machine learning feature extraction model, to generate a behavioral representation, that is probabilistic in nature, of invariant aspects of spatiotemporal utilization of the mobile radio network;

generate one or more instances of the spatiotemporal utilization of the mobile radio network that reflects the probabilistic nature of a spatiotemporal predictable component of the behavioral representation;

utilize the one or more instances of the spatiotemporal utilization of the mobile radio network as a dataset for training or evaluating a system to manage performance of the mobile radio network;

generate random obstruction probability data based on geographical data;

generate angle dependent fast fading data based on the mobile radio data; and add the random obstruction probability data and the angle dependent fast fading data to the spatiotemporal predictable component of the behavioral representation to generate signature data identifying a realistic discoverable spatiotemporal behavioral and fading signature.

14. The non-transitory computer-readable medium of claim 13, wherein the geographical data identifies classification data of the mobile radio network, obstruction data, network topology data, and demographic data associated with the geographical area.

15. The non-transitory computer-readable medium of claim 13, wherein the one or more instructions further cause the device to:

generate a validation dataset based on the one or more instances of the spatiotemporal utilization of the mobile radio network; and validate the system with the validation dataset.

16. The non-transitory computer-readable medium of claim 13, wherein the one or more instructions further cause the device to:

generate a test dataset based on the one or more instances of the spatiotemporal utilization of the mobile radio network; and test the system with the test dataset.

17. The non-transitory computer-readable medium of claim 13, wherein the one or more instructions further cause the device to:

train the machine learning feature extraction model with the one or more instances of the spatiotemporal utilization of the mobile radio network to generate results; and modify system performance parameters of the system based on the results.

18. The device of claim 7, wherein the one or more processors are further configured to:

cause the one or more instances of the spatiotemporal utilization of the mobile radio network to be implemented by an optimization component collocated with a network device associated with the mobile radio network.

19. The device of claim 18, wherein the optimization component is configured to utilize the one or more instances of the spatiotemporal utilization of the mobile radio network to identify behavior patterns associated with users in a coverage area of the network device.

20. The non-transitory computer-readable medium of claim 13, wherein the one or more instructions further cause the device to:

cause the one or more instances of the spatiotemporal utilization of the mobile radio network to be implemented by an optimization component collocated with a network device associated with the mobile radio network.

* * * * *